United States Patent [19]
Hickey

[11] 3,982,779
[45] Sept. 28, 1976

[54] CLAMPS FOR JOINING TUBES OR TUBULAR STRUCTURAL MEMBERS

[75] Inventor: Christopher Daniel Dowling Hickey, Esher, England

[73] Assignee: Airflex Containers Limited, Ashford, England

[22] Filed: Jan. 20, 1975

[21] Appl. No.: 542,424

[30] Foreign Application Priority Data
Jan. 24, 1974 United Kingdom............... 2649/74

[52] U.S. Cl. .............................. 285/328; 285/178; 285/373; 403/311
[51] Int. Cl.² ...................................... F16L 25/00
[58] Field of Search ........... 285/373, 419, 283, 328, 285/383, 178, 364, 365, 406, 407; 403/187, 19 L, 234, 235, 311; 24/132 WL, 249 WL

[56] References Cited
UNITED STATES PATENTS

| | | | |
|---|---|---|---|
| 1,357,894 | 11/1920 | Pearsull | 285/373 |
| 2,073,338 | 3/1937 | Durkee | 285/383 |
| 2,189,350 | 2/1940 | Morris | 285/373 |
| 2,880,761 | 4/1959 | Peter | 285/419 X |
| 3,345,092 | 10/1967 | Athman et al. | 285/283 |
| 3,737,180 | 6/1973 | Hayes | 285/373 |

FOREIGN PATENTS OR APPLICATIONS

| | | | |
|---|---|---|---|
| 774,641 | 9/1934 | France | 285/419 |
| 198,011 | 6/1958 | Germany | 285/373 |

*Primary Examiner*—Dave W. Arola
*Attorney, Agent, or Firm*—Young & Thompson

[57] ABSTRACT

A clamped assembly comprising one or more clamps securing tubes or tubular members together has the clamp or each clamp formed of two parts securable together, the clamping parts having a regular array of surface singularities, e.g. protruberances, which engage with a complementary array of singularities, e.g. dimples, on the tube or tubes so that, in the assembly each tube is positively located and firmly held without relaying on a frictional grip. The arrangement is particularly applicable to the jointing of tubes to form a pipe line, two tubes being joined end-to-end with a seal between or around the joint.

12 Claims, 5 Drawing Figures

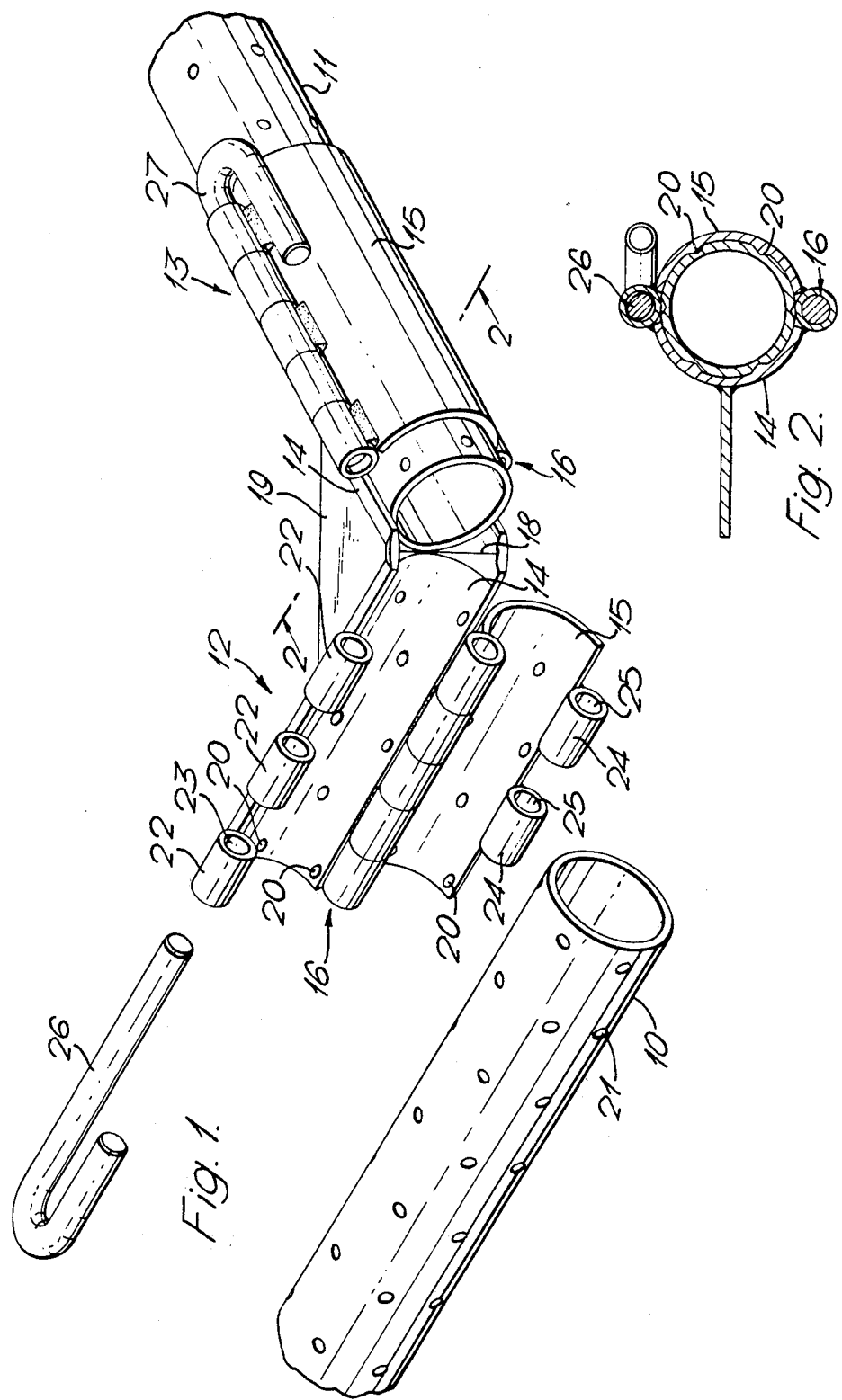

CLAMPS FOR JOINING TUBES OR TUBULAR STRUCTURAL MEMBERS

BACKGROUND OF THE INVENTION

1. Field of the Invention

This invention relates to clamped assemblies comprising tubes or tubular structural members which are clamped together to form an assembly. Such an assembly may be used for structural purposes or for the joining of lengths of tubes to form a pipe line.

2. Prior Art

It is well-known to form structures making use of tubular members which are clamped together. Such structures are widely used, for example for scaffolding and other purposes where ease of assembly and dismantling is required. Many types of clamps have been proposed for such structures but it is the usual practice to rely on a frictional grip between a clamp which is tightly secured around a tube. Tightening is usually effected by bolts although other forms of securing means have been proposed in the past.

SUMMARY OF THE INVENTION

It is an object of the present invention to provide an improved form of clamped assembly for joining tubes or pipes or for forming a tubular structural assembly which does not rely on a friction grip but gives positive locking between the clamp and the tubular members to be secured therein. As will be apparent from the following description, this leads not only to increased strength in the clamped structure compared with a frictional grip but also, by reason of the positive locking, ensures accurate location of the clamped elements. Because of this possibility of accurate location, it becomes possible to use the clamped structure for forming fluid-tight joints in pipes and thus the clamp system of the present invention may, in one of its forms, be used for joining together lengths of pipes, particularly metal pipes so obviating the need for welding.

According to the present invention, clamped assembly comprises at least two tubes and a clamp for joining said tubes, the clamp comprising at least one pair of elongate co-operating clamping parts, each pair of clamping parts being shaped to fit over part of the surface of at least one tube and bearing a regular array of spaced-apart surface singularities, the tube engaged by said clamping parts having complementary singularities in a similar spaced array, and means for connecting the clamping parts of each pair so as releasably to engage the array of surface singularities on each of the clamping parts with the array of complementary singularities on the tube.

The surface singularities may conveniently be protruberances which engage with complementary dimples. Instead of dimples, apertures may be employed. Other examples of suitable singularities are ridges and complementary grooves, more particularly circumferential ridges and grooves. It will be readily appreciated however that many forms of surface irregularities are possible and may be employed although generally, for ease of manufacture and for economy, simple patterns of regularly spaced easily formable shaped protruberances and depressions are preferred.

The two clamping parts of the clamp may surround the end of one tube. In this case a clamp assembly may comprise two or more separate clamps, one for each tube, which clamps are joined together, conveniently by rigidly securing one part of one clamp to one part of another clamp, for example by forming them integrally. In another arrangement the two clamping parts of the clamp surround the ends of two tubes. These tubes may be axially aligned.

If two axially-aligned tubes are joined by a clamp, a fluid-tight seal may be formed by suitable sealing means between or around the ends of the tubes. For example an O-ring seal may be provided between the ends of the tubes or a tubular seal may be provided in the form of a sleeve extending over the adjacent end portions of the clamped tubes. The seal may be of resilient material or, more particularly when a sleeve is employed, it may be formed of a metal which is soft and readily deformable compared with the material of the tubes. The choice of the seal material will commonly depend on the metal employed in the tubes and the material to flow through the tubes. The material may be an elastomer but commonly a soft metal like lead or tin may be employed, a short length of the soft metal sleeve being arranged to surround the ends of the tubes with the clamp extending beyond the lead so as to engage the tubes. In such a case a single clamp extending around the ends of both tubes may have clamping parts with an inwardly-directed ridge located and arranged so as, when the clamping parts are closed around the tube, to force the sleeve at least partly into the region between the ends of the tubes. More generally however the clamping parts may be shaped so that, when closed around the tubes, they press the seal into tight engagement with the tubes.

In forming structural assemblies, two or more tubular structural members may be joined. The assembled clamp may be of any suitable shape to provide different types of joints. For example the clamp may be in the form of a T piece to form a T-shaped joint or in the form of an L-shaped piece. More than two structural members may be connected by the same clamp or by two or more clamps which are joined together to form a clamping unit.

A clamp comprising a pair of co-operating clamping parts may be formed of separable clamping halves. Conveniently however the two parts forming a clamp are hinged together or otherwise interconnected to allow the tubes or tubular members to be engaged by the clamp.

The means for connecting the two clamping parts of the clamp together may comprise a spring member or threaded member, for example a wing nut. However many other types of interlocking means may be provided. For example each part of a clamp may have portions with bores which are axially aligned when the two parts are brought together around the tube whereby a key may be inserted through the aligned bores to secure the two parts together. In this latter case, conveniently the key is made substantially elliptical in section so that, even if the bores on the two parts are not exactly aligned due to incomplete closure of the clamping parts, the key may be inserted and can then be turned to close the two parts tightly with a cam action.

It will be appreciated that the strength in the clamp system depends primarily on the inter-engagement of the surface irregularities on the clamping parts of the tubes. Provided these are in engagement, then the tightness of the closure of the two parts together does not have any significant effect on the strength of the joint provided by the clamped assembly.

The tubular members are preferably cylindrical but the construction may be used with other shapes of tube for example square or elliptical cross-section tubes.

BRIEF DESCRIPTION OF THE DRAWINGS

FIG. 1 is an exploded isometric view of one construction of clamped assembly for clamping two tubes at right angles to one another;

FIG. 2 is a section along the line 2—2 of FIG. 1;

DESCRIPTION OF THE PREFERRED EMBODIMENTS

Figure 3:
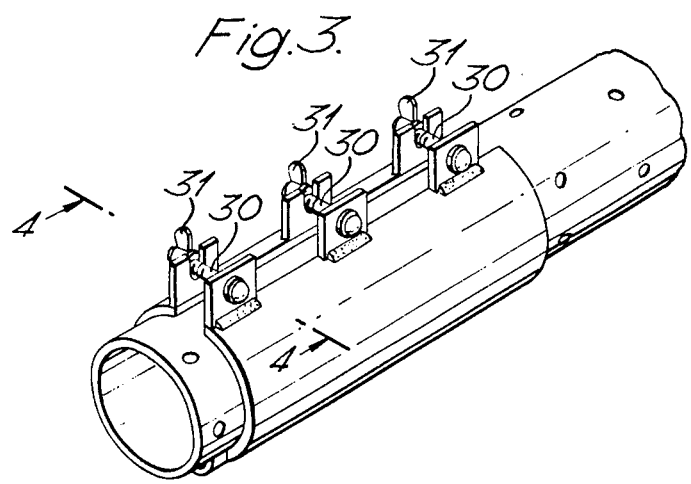
FIG. 3 is an isometric view illustrating a modification of part of the clamp assembly of FIG. 1.

Referring to FIGS. 1 and 2 there are shown parts of two tubes 10, 11 of cylindrical cross-section which are to be joined together at right angles to one another. The joint is effected by means of a clamping unit which comprises two separate clamps 12, 13 joined together to form a rigid structure. Each of the clamps 12, 13 is formed by two clamping parts 14, 15 which are of generally semi-cylindrical form and which are hinged together by a hinge 16 on the outer surface of the two clamping parts. In this particular embodiment, the clamping parts 14 of the two clamps 12, 13 are welded together at 18 so as to join one end of one clamping part to one end of the other clamping part. Additional strength is provided by a gusset plate 19 welded in the corner between the parts 14 of the two clamps.

The clamping parts 14, 15 are formed to have arrays of inwardly directed protruberances 20 on their internal surfaces, these protruberances being so arranged that when the two parts 14, 15 of the clamp are closed together, they form a regular array of protruberances around the tube to be clamped. Each tube is provided with a corresponding complementary array of dimples 21 so that each tube may be located in its clamp with the protruberances on the clamping parts engaging the dimples in the tube. This provides positive location of the tube in the clamping parts preventing both longitudinal or rotational movement of the tube in the clamp without relying on frictional grip.

To secure the two parts 14, 15 of each clamp together, one part, for example part 14, is provided with, in this particular example, three outwardly-extending portions 22 having aligned bores 23 and the other clamping part 15 is provided with, in this particular example, two similar outwardly-extending portions 24 with aligned bores 25, the portions 22, 24 being so positioned that, when the two clamping parts 14, 15 are closed together around the tube, the two portions 24 lie in the gaps between adjacent portions 22 with the bores 23, 25 aligned. To secure the two parts 14, 15 together, a key 26 is inserted through the aligned bores 23, 25. As is most clearly seen in FIG. 2, the part of the key 26 which is inserted through the bores is of elliptical or other slightly non-circular section. This is to enable the key readily to be inserted even if the bores are not exactly aligned through incomplete closure of the two clamping parts together. This might occur for example if dirt or other extraneous material has got between the clamping parts and the tube. If the parts 22, 24 are not quite aligned, the key 26 can be inserted and it can then be turned so as to pull the clamping parts tightly together.

Figure 4:
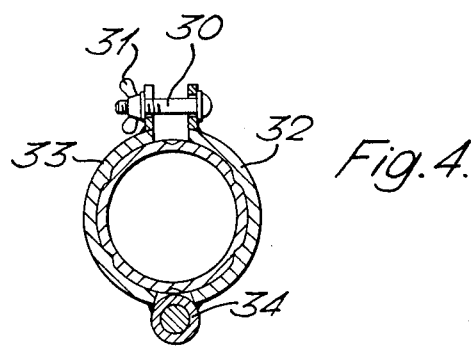
FIG. 4 is a section along the line 4—4 of FIG. 3.

With the above-described form of construction, the protruberances and dimples 20, 21 on the surface of the clamps and tubes provide the necessary strength and also ensure positive and accurate location of the tubes in the clamp. The keys 26 merely serve to hold the clamps closed. It is readily possible to use other securing means for this purpose. For example simple spring clips might be employed to hold the two parts together. FIGS. 3 and 4 illustrate another construction in which threaded bolts 30 with wing nuts 31 are provided for securing together two clamping parts 32, 33 which are hinged at 34.

Figure 5:
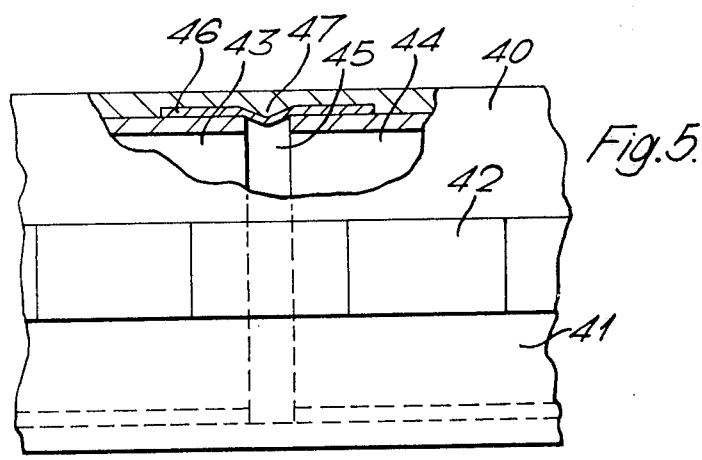
FIG. 5 is a view in elevation, partly cut away, of part of a clamped structure joining the ends of two lengths of tube to form a pipe line.

The clamped assembly, because it positively locates and holds in position the tubes within the clamp, may be used for forming a fluid-tight joint between two tubes. In this case, a single clamp is arranged to hold two tubes in axial alignment. FIG. 5 shows part of such a clamp. This clamp is constructed in a similar manner to the clamps of FIGS. 1 and 2 and comprises two clamping parts 40, 41 which are hinged together at 42 and which can be secured together by a key (not shown) similar to the keys 26 of FIG. 1. These two clamping parts have protruberances or other surface singularities in a regular array for engaging complementary singularities in the surface of two tubes 43, 44 near the ends thereof. The tubes, when so engaged by the clamps, are held in a fixed position relative to one another with a small gap 45 between their end surfaces. To effect a fluid-tight seal, a seal is provided within the clamp and extending around the end portions of the two tubes. This seal is conveniently a sleeve 46 which is slipped over the ends of the two tubes, being formed of a suitable flexible and/or resilient material for this purpose. The choice of material for the seal will depend on the fluid to be carried through the pipe line. For many purposes however it is convenient to use a soft metal, that is to say a metal which is softer than the clamp or tube material. Conveniently a tin or lead sleeve 46 is used for this purpose. The clamp has a ridge 47 on its inner surface so positioned as to force the soft metal sleeve inwardly between the tubes in the region 45 between the ends of the two tubes. This compresses the sleeve around the shoulders at the end of each tube so ensuring a tight seal. The sleeve 46 extends for only a short distance within the clamp and the clamping parts extend along the tube beyond the ends of the seal and, in this region, have the surface singularities to engage the singularities in the tube surface.

Although in the foregoing there has been described a right angle junction assembly for tubular structural members and an end-to-end junction for two tubes, it will readily be appreciated that other structural arrangements may be formed. For example the clamp of FIG. 1 might be used to form a T-junction by putting one pair of clamping members over a tube intermediate its ends. Obviously however the two separate clamps may be assembled in a different arrangement to form a T-junction and it is readily possible to provide more than one separately openable clamp in a single clamp assembly. Moreover a clamp for a clamp assembly may be arranged to embrace two tubes which can be aligned as in the case of the pipe joint or may be at an angle to one another.

The pairs of clamping parts might be arranged to connect two tubular members in the form of a cross. In this case, one clamping half in one pair is connected at a point along its length to a clamping half in the other pair in a back-to-back arrangement. The tubular members need not, in such a construction necessarily cross at right angles and, if necessary, the two parts of the clamp assembly may be adjustable so as to accommodate a variety of included angles between the tubular members thus joined.

I claim:

1. A clamped assembly comprising at least two tubes and a clamp for joining said tubes, the clamp comprising at least one pair of elongate co-operating semi-cylindrical clamping parts the pair of clamping parts being shaped to fit over part of the surface of at least one tube and bearing a regular array of spaced-apart surface singularities, the tube engaged by said clamping parts having complementary singularities in a similar spaced array, a hinge connecting the two clamping parts of the pair along a lengthwise extending edge of each part, the parts each having protruding portions with bores parallel to but spaced from the hinge axes and arranged to be aligned when the two parts are closed together, and a key of substantially elliptical cross-section for insertion in the aligned bores so that the pair of clamping parts, after being put around at least one tube engage the array of surface singularities on each of the clamping parts with the array of complementary singularities on the tube, the parts being tightenable onto the tube by rotation of the key.

2. A clamped assembly as claimed in claim 1 wherein the two clamping parts of the clamp are arranged to surround the end of one tube.

3. A clamped assembly as claimed in claim 1 wherein the two clamping parts of the clamp are arranged to surround the ends of two axially aligned tubes.

4. A clamped assembly as claimed in claim 3 wherein an O-ring seal is provided between the ends of the tubes.

5. A clamped assembly as claimed in claim 3 wherein a tubular seal is provided extending over the adjacent end portions of the clamped tubes.

6. A clamped assembly as claimed in claim 4 wherein the seal is of resilient material.

7. A clamped assembly as claimed in claim 5 wherein the seal is formed of a metal which is soft and readily deformable compared with the material of the tubes.

8. A clamped assembly as claimed in claim 4 wherein the clamping parts are shaped so that, when closed around the tubes, they press the seal into tight engagement with the tubes.

9. A clamped assembly as claimed in claim 5 wherein a single clamp extends around the ends of both tubes with the clamping parts having an inwardly-directed ridge located and arranged so as, when the clamping parts are closed around the tubes, to force the seal at leasat partly into the region between the ends of the tubes.

10. A clamped assembly as claimed in claim 1 and having at least two clamps each formed of a pair of clamping parts, with means rigidly connecting one part of one pair to one part of another pair.

11. A clamped assembly as claimed in claim 1 wherein the singularities and complementary singularities comprise protruberances and dimples.

12. A clamped assembly comprising a pair of cylindrical tubes of the same diameter arranged end to end in axial alignment, a two-part clamp, each part of the clamp being substantially semi-cylindrical in form and of a size to fit closely around the adjacent ends of the two tubes, the two parts being hingedly connected along respective longitudinal edges of the two semi-cylindrical parts, means releasably securing the other two longitudinal edges of the two parts of the clamp together, and a sleeve of deformable sealing material and of shorter length than the clamp arranged around the adjacent ends of the tubes, the clamping parts having a recess to accommodate said sleeve, the portions of the clamping parts beyond each end of the sleeve having arrays of surface singularities and the surfaces of the tubes within said clamping parts having corresponding arrays of complementary surface singularities so that the tubes and clamping parts are interlocked by inter-engagement of the surface singularities, said surface irregularities and said complementary surface irregularities being arranged so that the facing ends of the two tubes are slightly spaced apart, and said clamping parts further having an inwardly-directed annular ridge on their surface around the space between the ends of the two tubes so that, when the two parts are clamped around the sleeve and tube, the deformable material of the sleeve is forced into the space between the facing ends of the two tubes.

* * * * *